United States Patent
Baik et al.

(10) Patent No.: US 9,309,328 B2
(45) Date of Patent: *Apr. 12, 2016

(54) PREPARATION METHOD OF CATIONIC DEXTRIN

(71) Applicant: University-Industry Cooperation Group of Kyung Hee University, Gyeonggi-do (KR)

(72) Inventors: Moo Yeol Baik, Gyeonggi-do (KR); Ah Ra Cho, Gyeonggi-do (KR); Byung Yong Kim, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 235 days.

This patent is subject to a terminal disclaimer.

(21) Appl. No.: 14/020,228

(22) Filed: Sep. 6, 2013

(65) Prior Publication Data

US 2014/0343274 A1    Nov. 20, 2014

(30) Foreign Application Priority Data

May 16, 2013  (KR) .................. 10-2013-0056031

(51) Int. Cl.
*C08B 31/12* (2006.01)
*C11D 1/62* (2006.01)

(52) U.S. Cl.
CPC .................... *C08B 31/125* (2013.01)

(58) Field of Classification Search
CPC ...................................... C08B 31/125
See application file for complete search history.

(56) References Cited

U.S. PATENT DOCUMENTS

| | | | | | |
|---|---|---|---|---|---|
| 3,842,005 | A | * | 10/1974 | Moser et al. | C02F 1/5263 162/175 |
| 3,846,405 | A | * | 11/1974 | McClendon | C02F 1/54 106/127.1 |
| 4,179,382 | A | | 12/1979 | Rudkin et al. | |

FOREIGN PATENT DOCUMENTS

| KR | 100893568 B1 | 4/2004 |
|---|---|---|
| KR | 100887699 B1 | 3/2009 |

OTHER PUBLICATIONS

Korean Office Action dated Oct. 14, 2014, for corresponding Korean Patent Application No. 10-2013-0056031.
Ahra Cho et al., "Characterization of Cationic Dextrin Prepared by Ultra High Pressure (UHP)-Assisted Cationization Reaction", Carbohydrate Polymers,97 (2013) 130-137.

* cited by examiner

*Primary Examiner* — Jonathan S Lau
(74) *Attorney, Agent, or Firm* — Kinney & Lange, P.A.

(57) ABSTRACT

Disclosed herein is a method of preparing a cationic dextrin, including: performing cationization reaction by adding a cationization agent to dextrin.

10 Claims, 5 Drawing Sheets

PREPARATION METHOD OF CATIONIC DEXTRIN

CROSS-REFERENCE TO RELATED APPLICATION

This application claims priority to Korean Patent Application No. 10-2013-0056031 filed on 16 May, 2013, and all the benefits accruing therefrom under 35 U.S.C. §119, the contents of which is incorporated by reference in its entirety.

BACKGROUND

1. Technical Field

The present invention relates to a method of preparing cationic dextrin.

2. Description of the Related Art

Starch is a large biopolymer composed of glucose molecules linked by $\alpha$-1,4 and $\alpha$-1,6 glycosidic bonds in nature, and provides 70% to 80% of calories consumed by man. Starch is as important raw material widely used in food as well as other industrial applications. Thus, starch can be modified by physical or chemical methods to prepare various starches having specific physical properties as well as inherent properties thereof.

Dextrin is a hydrolysis product generated in an intermediate stage from starch to maltose when starch is hydrolyzed by acid, heat, enzymes, and so on. Dextrin is a generic term for polysaccharides having a smaller molecular weight than starch, and is also referred to as starch gum. Dextrin includes a broad range of polysaccharides from soluble starches having a high molecular weight to polysaccharides having a low molecular weight, which do not react with iodine. Further, processed dextrin obtained by concentrating and drying dextrin is also called dextrin. Industrially, starch is hydrolyzed primarily by acids or heat, and three kinds of dextrin, i.e., white dextrin, light yellow dextrin, and yellow dextrin, are produced according to the degree of hydrolysis. White dextrin is dissolved in an amount of 40% or more in cold water, and completely dissolved in hot water. White dextrin can be mainly as finishing glues for silk or as an excipient for drugs. Light yellow dextrin and yellow dextrin are readily soluble in cold water and have a low viscosity, and thus can be used as glues for use in offices, aqueous paints, baking substances, excipients for drugs or caking additives for briquettes, and the like.

As a raw material for dextrin, starch may be processed into starch acetate (Korean Patent No. 10-0893568), hydroxypropylated starch (Korean Patent No. 10-0887699), crosslinked starch, and the like for industrial application. However, methods for processing dextrin are not as diverse as though for processing starch.

In studying a method of processing dextrin, the present inventors have found that cationic dextrin can be prepared by adding water, a cationization agent, a reaction initiator, and the like to dextrin, and reacting the same under specific temperature and pressure conditions. The present inventors have completed the present invention on the basis of these findings.

BRIEF SUMMARY

An aspect of the present invention is to provide a method of preparing a cationic dextrin.

In accordance with one aspect of the present invention, a method of preparing a cationic dextrin includes: performing cationization reaction by adding a cationization agent to dextrin.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
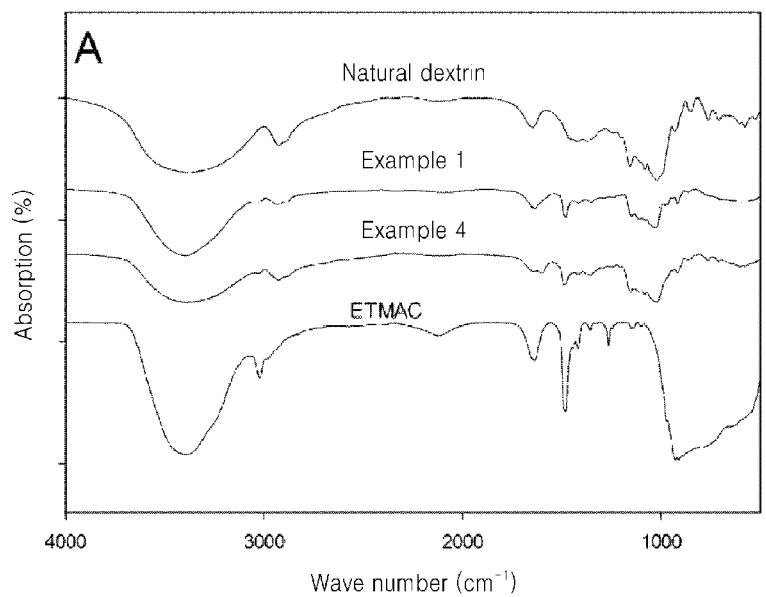
FIG. 1 shows FT-IR spectrum curves of cationic dextrin.
Figure 1:
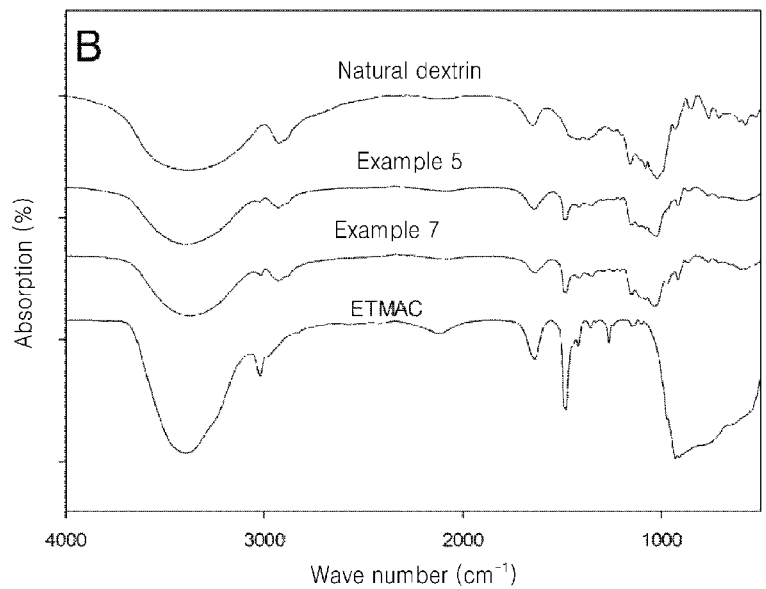

The present invention relates to a method of preparing cationic dextrin, which includes: performing cationization reaction by adding a cationization agent to dextrin.

In addition, the present invention relates to a cohesive agent including the cationic dextrin prepared by the method according to the present invention.

Hereinafter, the present invention will be described in detail.

Dextrin in the present invention, dextrin refers to typical dextrin used in the art and is not particularly limited. Dextrin may be commercially obtained or directly prepared and used.

Aqueous Dextrin Solution

In the present invention, dextrin may be used as an aqueous dextrin solution prepared by adding water to dextrin. That is, in the present invention, dextrin may be added to water to prepare an aqueous dextrin solution, followed by adding a cationization agent to perform cationization reaction. The aqueous dextrin solution includes 70 parts by weight to 800 parts by weight of water, preferably 100 parts by weight to 600 parts by weight of water, more preferably 110 parts by weight to 500 parts by weight of water, based on 100 parts by weight of dry dextrin. When water is added in an amount of less than 70 parts by weight, substitution reaction becomes difficult since the viscosity of the aqueous dextrin solution becomes too high or the amount of water between dextrin particles is insufficient. When the amount of water exceeds 800 parts by weight, the concentration of the aqueous dextrin solution becomes too low, deteriorating efficiency of the cationization reaction.

Cationization Agent

Cationization agents used in the present invention refer to common cationization agents, and are not particularly limited. Examples of cationization agents used in the present invention include compounds having an amino group, an imino group, ammonium sulfonate, a phosphonium group, or the like, which are positively charged. For example, the cationization agents according to the present invention may include (4-chlorobutene-2)-trimethyl ammonium chloride, 2-diethylaminoethyl chloride, 2,3-(epoxypropyl)trimethyl ammonium chloride, 3-chloro-2-hydroxypropyl)trimethyl ammonium chloride, and the like. Preferably, 2,3-(epoxypropyl)trimethyl ammonium chloride is used. The cationization agent is added in an amount of 110 parts by weight to 280 parts by weight, preferably 180 parts by weight to 250 parts by weight, based on 100 parts by weight of dry dextrin. When the amount of the cationization agent is less than 100 parts by weight, cationization reaction can be insufficiently performed. When the amount of the cationization agent is greater than 280 parts by weight, there is no economic advantage in reaction efficiency in comparison to the amount of cationization agent.

Reaction Initiator

The aqueous dextrin solution may further include a reaction initiator, which initiates cationization reaction. The reaction initiator may be a base, such as sodium hydroxide, ammonium sulfate, tertiary amine, and the like.

The reaction initiator is added in an amount of 0.1 parts by weight to 10 parts by weight, preferably 1.0 part by weight to 7 parts by weight, based on 100 parts by weight of dry dextrin. When the amount of the reaction initiator is less than 0.1 parts by weight, cationization reaction can be insufficiently performed.

The reaction initiator may be added before or after the cationization agent is added to the aqueous dextrin solution, according to user selection.

Cationization Reaction

Cationization reaction may be performed at a pressure of at least 0.08 MPa to less than 700 MPa for at least 10 minutes to less than 10 hours. Preferably, cationization reaction is performed at a pressure of at least 0.8 MPa to less than 90 MPa for at least 1 hour to less than 10 hours, or at a pressure of at least 90 MPa to less than 700 MPa for at least 10 minutes to less than 1 hour.

When cationization reaction is performed at a pressure of at least 0.8 MPa to less than 90 MPa for at least 1 hour to less than 10 hours, it is possible to prepare cationic dextrin that has a relatively high degree of substitution in view of the concentration of the aqueous dextrin solution. Preferably, cationization reaction is performed at a pressure of at least 0.9 MPa to less than 50 MPa for at least 3 hours to less than 7 hours in order to achieve reaction efficiency in consideration of the concentration of the aqueous dextrin solution and reaction time. When the reaction time is less than 1 hour, the effect of cationization reaction can be insignificant. When the reaction time is 10 hours or more, the reaction efficiency can be deteriorated in consideration of the degree of substitution of the cationic dextrin and production amount.

When cationization reaction is preformed at a pressure of at least 90 MPa to less than 700 MPa (ultrahigh pressure) for at least 10 minutes to less than 1 hour, there is an advantage that reaction time is shortened, which is useful in industrial scale production. In this case, it is efficient to perform the cationization reaction at a pressure of at least 100 MPa to less than 500 MPa for at least 20 minutes to less than 40 minutes when considering the reaction time and the degree of substitution of the cationic dextrin.

Those skilled in the art can select an appropriate pressure, time and the like by taking into account of desired degree of substitution of cationic dextrin, concentration of aqueous dextrin solution usable (dextrin concentration in an aqueous dextrin solution), reaction time, and the like.

Flocculating Agent

The present invention relates to a cohesive agent including the cationic dextrin. The cationic dextrin is preferably produced by the preparation method according to the present invention. The flocculating agent may be used to remove suspended materials using flocculation of the cationic dextrin.

Fabric Softener

The present invention relates to a fabric softener including the cationic dextrin. The cationic dextrin is preferably produced by the preparation method of the present invention and may serve as a surfactant scavenger.

The above and other advantages and features of the present invention will become clear with reference to the following examples and experimental examples. However, it should be understood that the present invention is not limited to the following examples and may be embodied in different ways, and that these examples are given to provide complete disclosure of the invention and to provide thorough understanding of the invention to those skilled in the art. The scope of the invention is limited only by the accompanying claims and equivalents thereof.

Material and Method

Dextrin was commercially obtained.

Dextrin used in the following examples was Glucidex 12 (Roquette Corporation, Lestrem, France). 2,3-epoxypropyl trimethyl ammonium chloride (ETMAC) used as a cationization agent was obtained as a 73% aqueous solution from KCI Co., Ltd. (Sihwa, Korea). Other reagents such as isopropanol and sodium hydroxide were obtained from Daejung Chemicals Co., Ltd.

In order to measure the amount of the cationization agent substituted in samples, nitrogen content analysis was performed using a semi-micro-Kjeldahl method using a digester MBCM12 (Raypa, Barcelona, Spain), a distiller DNP1500 (Raypa, Barcelona, Spain), and a titrater Akku-Drive (Hirschmann Laborgerate, Eberstadtt, Germany).

In order to determine whether the cationization agent was substituted, FT-IR (Spectrum One System, Perkin-Elmer, Waltham, Mass., USA) structure was analyzed using infrared rays. Further, the structures of natural dextrin and cationic dextrin were analyzed using 300 MHz $^{13}$C NMR (JNM-AL300, JEOL, Tokyo, Japan).

Thermal decomposition characteristics of the samples were evaluated through TGA (Thermogravimetric Analysis) and DTG (Derivative Thermogravimetric Analysis). 10 mg of a sample in dried powder was placed in an aluminum pan, followed by heating, thereby determining weight loss and decomposition temperature upon heating using a TGA instrument (TGA Q5000 IR, TA Instruments, New Castle, Del., USA).

Example 1

30 g of dextrin DE12 was added to 150 ml of distilled water to prepare an aqueous dextrin solution. Then, 2,3-epoxypropyl trimethyl ammonium chloride (ETMAC) was added as a cationization substitution agent to the solution. When the addition of ammonium compound was completed, sodium hydroxide was added as a reaction initiator. The aqueous dextrin solution to which ETMAC and sodium hydroxide were added was continuously stirred and reacted using a stirrer at room temperature (25° C.) and 0.1 MPa for 5 hours (namely, 300 minutes). When the reaction was completed, the aqueous dextrin solution was washed several times with an amount of isopropanol equal to three times the volume of dry dextrin, and dried using a hot air dryer, followed by crushing to obtain cationic dextrin.

Example 2

30 g of dextrin DE12 was added to 150 ml of distilled water to prepare an aqueous dextrin solution. Then, 2,3-epoxypropyl trimethyl ammonium chloride (ETMAC) was added as a cationization substitution agent to the solution. When the addition of ammonium compound was completed, sodium hydroxide was added as a reaction initiator. The aqueous dextrin solution to which ETMAC and sodium hydroxide were added was placed in a plastic pouch, sealed and provided to an ultrahigh pressure apparatus to which a pressure of 100 MPa was applied for 30 minutes using distilled water as a pressure transfer medium. After subjecting to ultrahigh pressure, the aqueous dextrin solution in which reaction was completed was washed several times with an amount of isopropanol equal to three times the volume of dry dextrin, and dried with a hot air dryer, followed by crushing to obtain cationic dextrin.

Example 3

Cationic dextrin was prepared in the same manner as in Example 2 except that dextrin was subjected to an ultrahigh pressure of 300 MPa instead of 100 MPa.

Example 4

Cationic dextrin was prepared in the same manner as in Example 2 except that dextrin was subjected to an ultrahigh pressure of 500 MPa instead of 100 MPa.

Example 5

30 g of dextrin DE12 was added to 37 ml of distilled water to prepare an aqueous dextrin solution. Then, 2,3-epoxypropyl trimethyl ammonium chloride (ETMAC) was added as a cationization substitution agent to the solution. Once addition of the ammonium compound was completed, sodium hydroxide was added as a reaction initiator. The aqueous dextrin solution to which ETMAC and sodium hydroxide were added was continuously stirred and reacted using a stirrer at room temperature (25° C.) and 0.1 MPa for 5 hours (namely, 300 minutes). When the reaction was completed, the aqueous dextrin solution was washed several times with isopropanol with an amount of isopropanol equal to three times the volume of dry dextrin, and dried with a hot air dryer, followed by crushing to obtain cationic dextrin.

Example 6

30 g of dextrin DE12 was added to 37 ml of distilled water to prepare an aqueous dextrin solution. Then, 2,3-epoxypropyl trimethyl ammonium chloride (ETMAC) was added as a cationization substitution agent to the solution. Once addition of the ammonium compound was completed, sodium hydroxide was added as a reaction initiator. The aqueous dextrin solution to which ETMAC and sodium hydroxide were added was placed in a plastic pouch, sealed and provided to an ultrahigh pressure apparatus to which a pressure of 100 MPa was applied for 30 minutes using distilled water as a pressure transfer medium. After subjecting to ultrahigh pressure, the aqueous dextrin solution in which reaction was completed was washed several times with an amount of isopropanol equal to three times the volume of dry dextrin, and dried with a hot air dryer, followed by crushing to obtain cationic dextrin.

Example 7

Cationic dextrin was prepared in the same manner as in Example 6 except that dextrin was subjected to ultrahigh pressure of 300 MPa instead of 100 MPa.

Example 8

Cationic dextrin was prepared in the same manner as in Example 6 except that dextrin was subjected to ultrahigh pressure of 500 MPa instead of 100 MPa.

In Examples 1 to 8, the amounts of ETMAC and sodium hydroxide added were adjusted according to concentration of the aqueous dextrin solution. Details of components used in Examples 1 to 8 are shown in Table 1.

TABLE 1

| | Dextrin (g) | ETMAC (g) | NaOH (g) | Distilled water (ml) | Pressure (MPa) | Reaction time (min) |
|---|---|---|---|---|---|---|
| Example 1 | 30 | 60 | 1.50 | 150 | 0.1 | 300 |
| Example 2 | 30 | 60 | 1.50 | 150 | 100 | 30 |
| Example 3 | 30 | 60 | 1.50 | 150 | 300 | 30 |
| Example 4 | 30 | 60 | 1.50 | 150 | 500 | 30 |
| Example 5 | 30 | 71 | 0.53 | 37 | 0.1 | 300 |
| Example 6 | 30 | 71 | 0.53 | 37 | 100 | 30 |
| Example 7 | 30 | 71 | 0.53 | 37 | 300 | 30 |
| Example 8 | 30 | 71 | 0.53 | 37 | 500 | 30 |

Experimental Example 1

Nitrogen content in the cationic dextrins of Examples 1 to 8 was measured in accordance with a method of Kjeldahl (Kjeldahl, 1883). Namely, 10 ml of sulfuric acid and a decomposition accelerator were added to 0.5 ml of a sample, which was heated at 400° C. for 2 to 3 hours to remove moisture and other impurities. After heating, the sample was cooled, and 40 ml of 40% sodium hydroxide solution was added and sufficiently mixed therewith Ammonia gas generated was collected in 4% aqueous borate solution containing an indicator. The aqueous borate solution in which ammonia was collected was titrated with 0.1N HCl until the color of the solution was changed. The content of nitrogen and the degree of substitution (DS) were respectively calculated from Equations 1 and 2, wherein natural dextrin was used as a control group.

$$\% \text{ Nitrogen} = \{(B-S) \times F \times 1.401 \times K\}/\text{collected amount of sample (g)} \qquad <\text{Equation 1}>$$

$$\text{Degree of Substitution} = (162 \times \% \text{ Nitrogen})/\{1400 - (151.5 \times \% \text{ Nitrogen})\} \qquad <\text{Equation 2}>$$

wherein B is a titrated amount (ml) of 0.1N HCl solution in a blank test; S is a titrated amount (ml) of 0.1N HCl solution (ml) in testing; F is a titer of 0.2N HCl solution; and K is an instrument constant.

As a result, it was observed that the nitrogen content of natural dextrin was very low, less than 0.1%. On the other hand, it was observed that dextrin prepared in Examples 1 and 5 had very high nitrogen content ranging from 3.23% to 5.48% due to the presence of an ammonium group in the substituted cationization agent.

With regard to the degree of substitution of cationic dextrin dependent on the concentration of the aqueous dextrin solution (namely, concentration of dextrin in the aqueous solution), it was observed that, when a low concentration of the reaction solution was used, the cationic dextrin prepared at atmospheric pressure (Example 1) had a higher degree of substitution than the cationic dextrin prepared at ultrahigh pressures (Examples 2 to 4). Further, as the pressure was increased from 100 MPa to 500 MPa, the degree of substitution of the cationic dextrin tended to gradually increase (Examples 2 to 4).

Unlike the case where a low concentration of the reaction solution was used, a high concentration of the reaction solution generally resulted in a high degree of substitution of the produced cationic dextrin. More specifically, when the pressure was increased from 100 MPa to 300 MPa, the degree of substitution of the produced cationic dextrin was increased (Examples 6 and 7). When the cationic dextrin was treated at 500 MPa, the degree of substitution was considerably decreased (Example 8) (Table 2). With regard to this result, it was considered that, when a low concentration of the aqueous dextrin solution was used, the amounts of moisture and NaOH were excessively increased in the reaction solution, and caused increase in generation of by-products, such as glycol, dimer or trimer of ETMAC, and the like, due to side reaction, thereby deteriorating reaction efficiency. However, although the degree of substitution of the dextrin prepared in Example 8 was lower than the dextrins prepared in Examples 6 and 7, the dextrin of Example 8 was sufficiently substituted to be used as cationic dextrin and was prepared within a remarkably short period of time as compared with Examples 1 and 5. Thus, it is considered that dextrin of Example 8 has sufficiently high industrial productivity.

Next, subsequent experiments were performed using the cationic dextrins of Examples 1, 4, 5 and 7 having high degrees of substitution in the aqueous dextrin solution to in each concentration.

TABLE 2

|  | Nitrogen content (%) | Degree of substitution |
|---|---|---|
| Example 1 | 4.05 ± 0.19 | 0.81 ± 0.07e |
| Example 2 | 3.23 ± 0.10 | 0.58 ± 0.03h |
| Example 3 | 3.50 ± 0.15 | 0.65 ± 0.04g |
| Example 4 | 3.92 ± 0.10 | 0.76 ± 0.03f |
| Example 5 | 4.93 ± 0.08 | 1.18 ± 0.04c |
| Example 6 | 5.15 ± 0.10 | 1.30 ± 0.06b |
| Example 7 | 5.48 ± 0.13 | 1.51 ± 0.09a |
| Example 8 | 4.38 ± 0.11 | 0.93 ± 0.05d |
| Natural dextrin | 0.08 ± 0.01 | 0.00 ± 0.00 |

Experimental Example 2

FT-IR Spectrum

FT-IR spectrum was recorded with regard to natural dextrin, ETMAC and cationic dextrins of Examples 1, 4, 5 and 7.

Results are shown in FIG. 1. Bands near 3400 cm$^{-1}$ and 2930 cm$^{-1}$ appeared in all 8 curves due to stretching vibration of O—H and C—H, respectively. A band near 1636 cm$^{-1}$ was obtained by bending vibration of O—H. A band at 1155 cm$^{-1}$ was obtained only in dextrin by stretching vibration of C—O. Strong bands at 1100 cm$^{-1}$ and 1025 cm$^{-1}$ were obtained due to stretching vibration of $CH_2$—O—$CH_2$. The cationic dextrins of Examples 4 and 7 showed very similar FT-IR spectra (indicated as A and B, respectively), which illustrates that, although two kinds of cationic dextrin prepared by two different methods have different degrees of substitution, there is no significant difference in terms of physicochemical structure therebetween.

In the spectrum of ETMAC, a strong band was observed near 1480 cm$^{-1}$ due to stretching vibration of C—N, and a band was observed near 1265 cm$^{-1}$ due to an epoxy ether group. These two bands were not found in the spectrum of natural dextrin, and only a band at 1636 cm$^{-1}$ due to C—N bond was observed in the spectrum of the cationic dextrin. In light of these results, it can be seen that cationic dextrin was produced by reaction of ETMAC with dextrin, wherein the epoxy group of ETMAC was decomposed to replace the dextrin.

Experimental Example 3

$^{13}$C-NMR Spectrum

NMR spectra were recorded with regard to natural dextrin, ETMAC and cationic dextrins of Examples 1, 4, 5 and 7.

Figure 2:
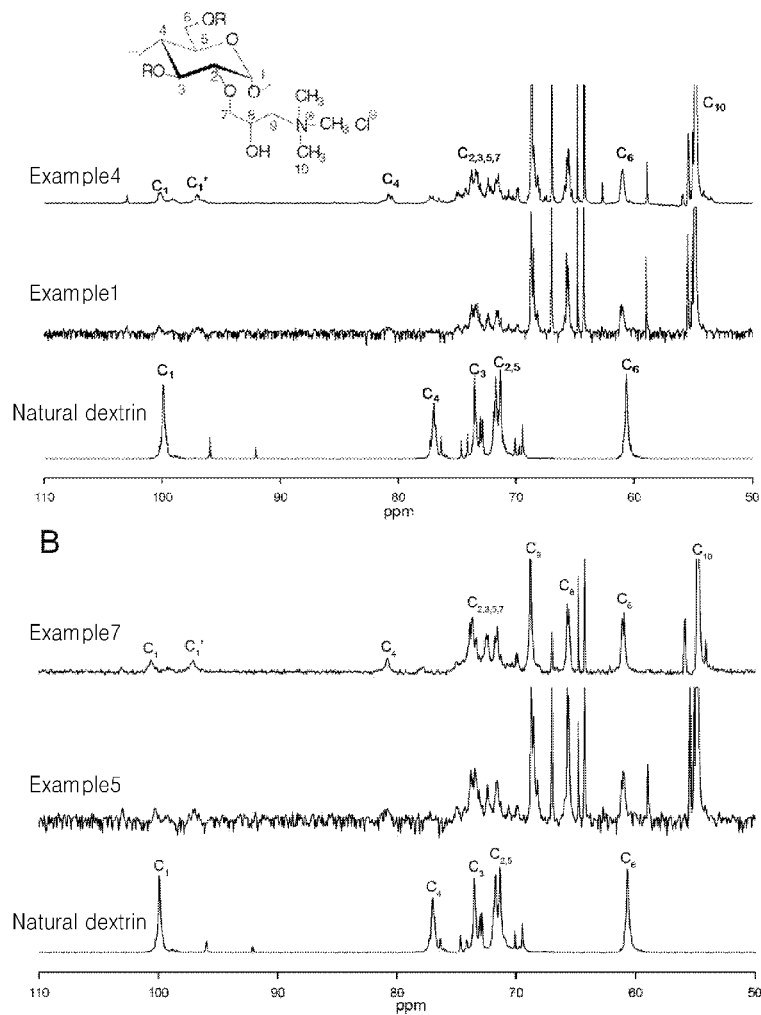
FIG. 2 shows NMR spectrum curves of cationic dextrin.

Results are shown in FIG. 2. In the spectrum of natural dextrin, some peaks appeared around 60 ppm, 70 to 80 ppm and 100 ppm due to carbon atoms in an anhydrous glucose unit. In the spectrum of the cationic dextrin, the intensity of these peaks gradually becomes smaller, while strong peaks (C7-C10) appeared due to the cationization substitution agent. Further, a strong peak specifically appeared at 55 ppm in the spectrum of the cationic dextrin is due to a methyl group in the cationization substitution agent and was not observed in the spectrum of natural dextrin. In light of these results, it can be seen that the cationic dextrin was produced by substituting dextrin with ETMAC, as observed in FT-IR spectrum.

Experimental Example 4

Thermogravimetric Analysis

In order to measure changes in thermal characteristics when natural dextrin was substituted with a cationization agent, thermal decomposition temperatures of samples were measured through thermogravimetric analysis.

Figure 3:
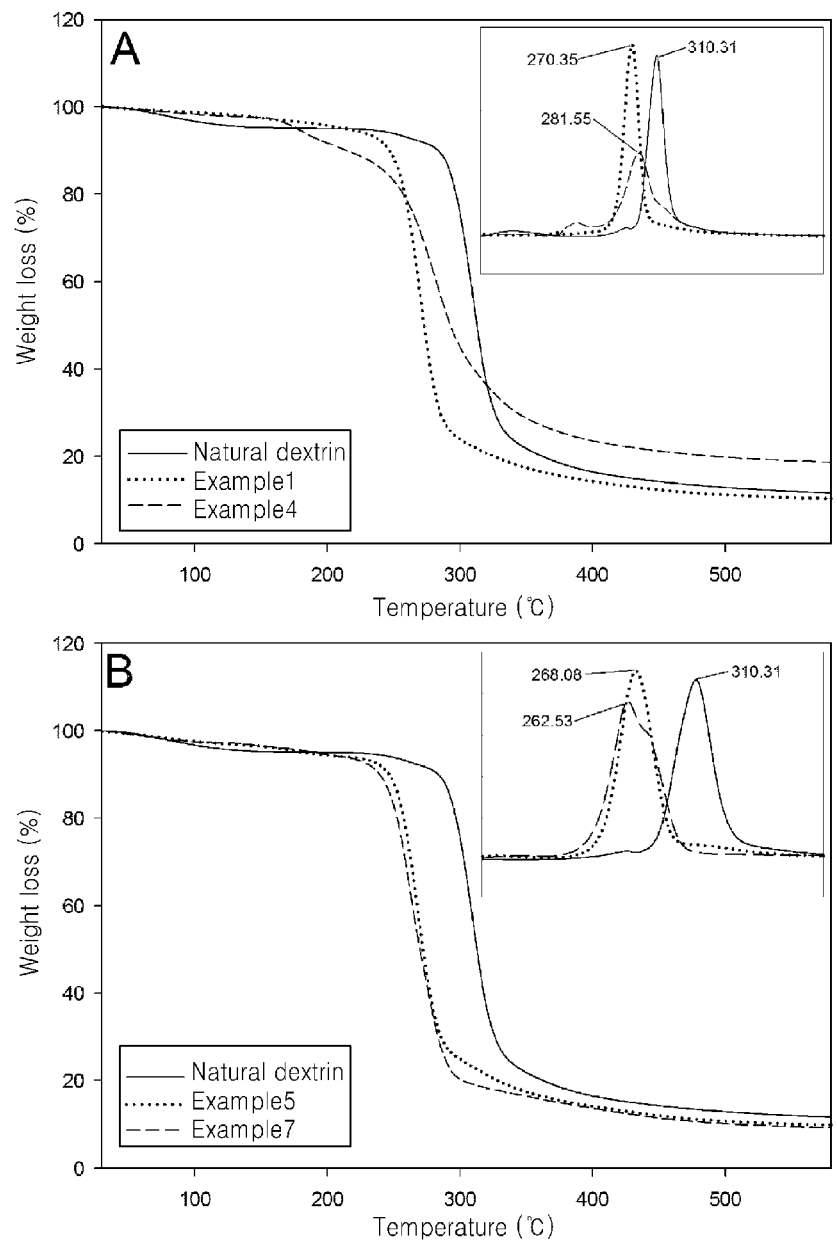
FIG. 3 shows thermal degradation according to temperatures of cationic dextrin.

Results are shown in FIG. 3. Boxes at a top right corner illustrate DTG graphs obtained by differentiating TGA graphs to measure exact decomposition temperatures. From these graphs, it can be seen that natural dextrin was completely decomposed at 310.31° C. On the contrary, the cationized samples of Examples 1 and 4 were decomposed at 270.35° C. and 281.55° C., respectively, and the cationized samples of Examples 5 and 7 were decomposed at 268.08° C. and 262.53° C., respectively. Accordingly, it was confirmed that the cationic dextrin was decomposed at a temperature lower than that of natural dextrin. It is considered that repulsion force between chains was increased due to substitution of a hydroxyl group of dextrin with the cationization agent, which in turn facilitated transfer of thermal energy.

Experimental Example 5

Flocculation of Cationic Dextrin Depending on Concentration

Flocculation of natural dextrin and cationic dextrins of Examples 1, 4, 5 and 7 was measured using 1% kaolin dispersion. The measurement was performed by the Shogren method (Shogren, R. L., Flocculation of kaolin by waxy maize starch phosphates. Carbohydrate Polymers 2009, 76 (4), 639-644). Change in cohesiveness of dextrin was measured depending on the concentration of dextrin and reaction time. Specifically, 100 ml of 1% kaolin dispersion was placed in a beaker, and stirred for 5 minutes. After lowering the stirring speed to 300 rpm, cationic dextrin was added in a concentration of 10 ppm to 100 ppm. Subsequently, the solution was stirred at 300 rpm for 2 minutes, followed by lowering the stirring speed to 180 rpm and stirring for 5 minutes. After stirring, the resultant was left for 2 minutes, and the supernatant was removed from the resultant to measure transmittance. Transparency was measured at 670 nm, and expressed as a percentage, assuming that the transmittance of distilled water is 100%.

Figure 4:
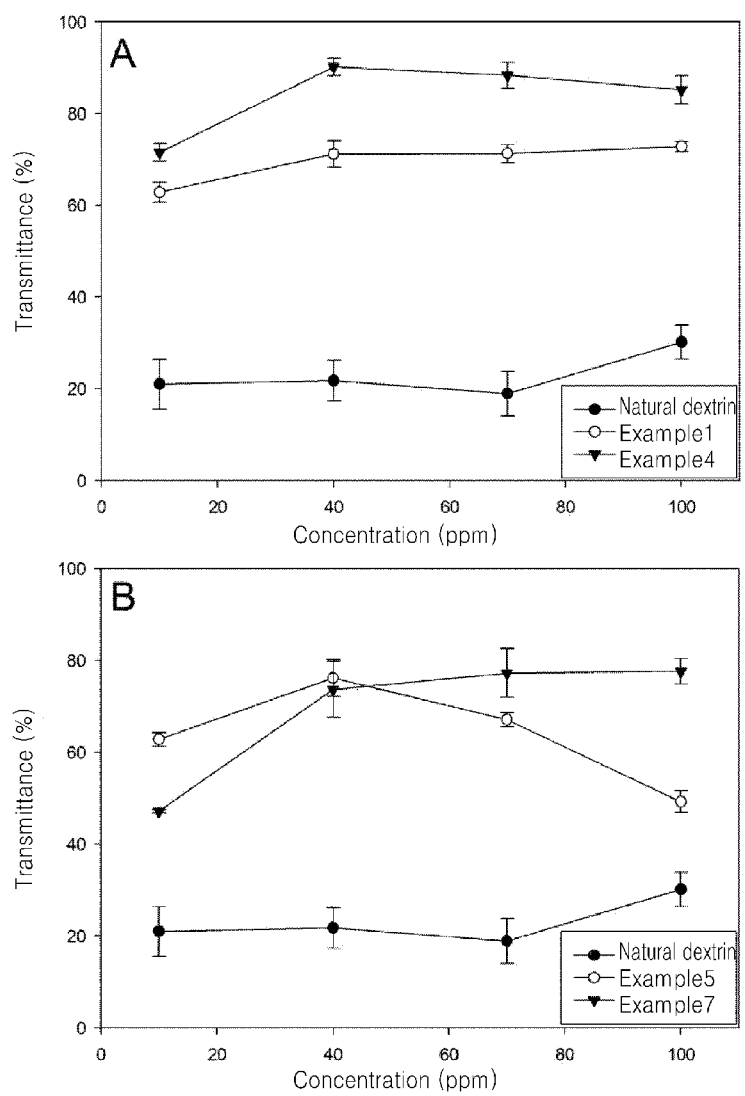
FIG. 4 shows flocculation according to concentrations of cationic dextrin.
Figure 5:
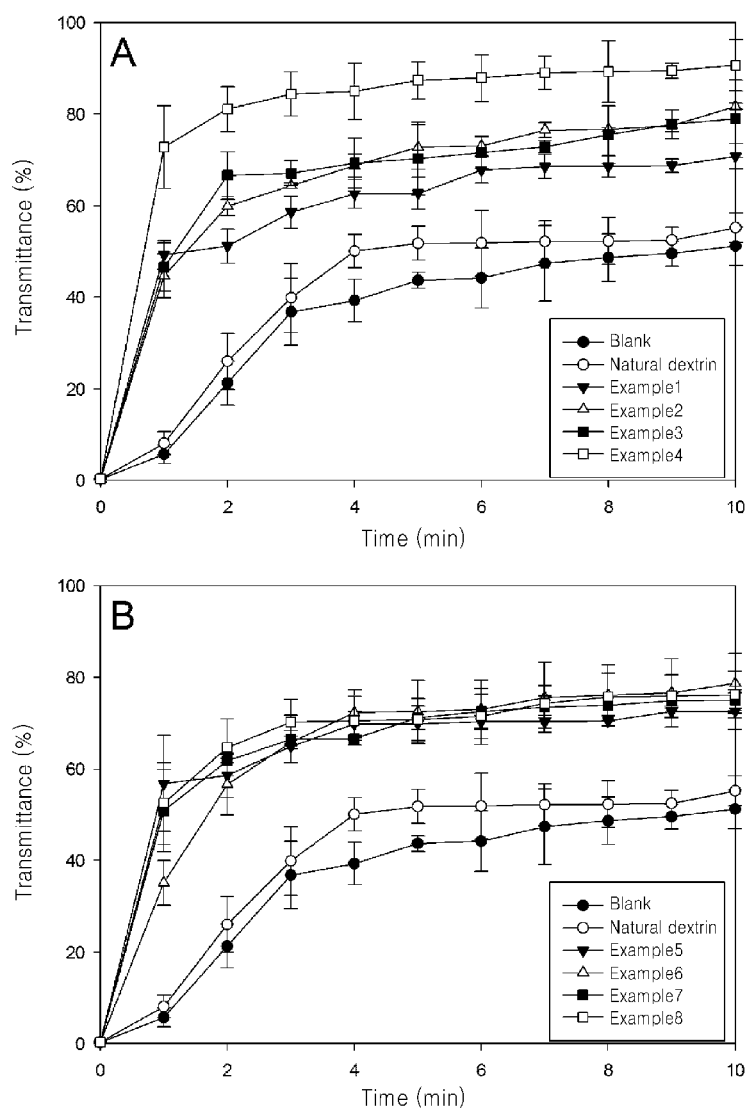
FIG. 5 shows flocculation according to reaction times of cationic dextrin.

Flocculation of cationic dextrin according to concentration is shown in FIG. 4. Natural dextrin showed a low flocculation of 30.2% even if the added amount was increased to 100 ppm. On the contrary, the cationic dextrin showed remarkably excellent flocculation. The cationic dextrins of Examples 1 and 4, wherein each sample was prepared using a low concentration of the aqueous dextrin solution, showed the highest flocculation of 72.8% and 90.2%, respectively (FIG. 4A). The cationic dextrins of Examples 5 and 7, wherein each sample was prepared using a high concentration of the aqueous dextrin solution, showed the highest flocculation values of 76.2% and 78.6%, respectively, which are lower than those of Examples 1 and 4 (FIG. 4B).

Experimental Example 6

Flocculation Depending on Reaction Time

Natural dextrin and cationic dextrins of Examples 1, 4, 5 and 7 were treated in a concentration of 40 ppm showing good flocculation in Experimental Example 5, and changes in transmittance according to precipitation time were measured. The detailed process of measuring transmittance has been set forth in Experimental Example 5.

As a result, in a blank test wherein the same amount of distilled water was added, it was observed that transmittance was remarkably increased only after leaving the aqueous solution for 7 minutes, which indicated completion of precipitation to some extent. After completion of precipitation for 10 minutes, the transmittance was 51.2%, which demonstrated that about half of the suspended materials remained. This result did not differ from the case of natural dextrin. That is, natural dextrin provided a final transmittance of 55.2%, which did not show much difference than the blank test, although the precipitation rate was slightly increased.

In comparison, the cationic dextrin showed remarkably enhanced final flocculation. For the cationic dextrins wherein low concentrations of reaction solutions were used, Example 1 showed a flocculation value of 70.8%, which was the lowest value among the cationic dextrin. For the cationic dextrins subjected to ultrahigh pressure, Examples 2 to 4 showed flocculation values of 81.7%, 79% and 90.7%, respectively, which demonstrated flocculation enhanced by up to 39.5% that of the control group (blank test). On the other hand, the cationic dextrin wherein high concentrations of reaction solutions were used showed flocculation values of 72.6% to 78.7% without showing any critical difference according to treatment pressure or whether ultrahigh pressure was applied. The flocculation was enhanced by up to 27.5% over the control group.

As discussed above, in the control group, cohesion and precipitation were completed to some extent after only 7 minutes. On the contrary, in the dispersion containing cationic dextrin, almost all of the suspended materials were initially removed within 2 minutes, and after 5 minutes at maximum, the precipitation reaction was almost complete.

From the above results, it can be confirmed that the cationic dextrin is capable of removing suspended materials quickly and effectively regardless of ultrahigh pressure treatment. Accordingly, it is determined that the cationic dextrin has sufficient applicability as a commercial cohesive agent.

As such, the preparation method according to the present invention may provide cationic dextrin having a high degree of substitution and high cohesion.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. A method of preparing cationic dextrin, comprising: performing a cationization reaction by adding a cationization agent to dextrin, wherein the cationization reaction is performed at a pressure of at least 90 MPa to less than 700 MPa.

2. The method according to claim 1, wherein the dextrin is an aqueous dextrin solution obtained by adding dextrin in water.

3. The method according to claim 2, wherein the aqueous dextrin solution comprises 70 parts by weight to 800 parts by weight of water based on 100 parts by weight of dry dextrin.

4. The method according to claim 1, wherein the cationization agent is added in an amount of 110 parts by weight to 280 parts by weight based on 100 parts by weight of dry dextrin.

5. The method according to claim 1, wherein a reaction initiator is further added to dextrin.

6. The method according to claim 5, wherein the reaction initiator is a base.

7. The method according to claim 5, wherein the reaction initiator is added in an amount of 0.1 parts by weight to 10 parts by weight based on 100 parts by weight of dry dextrin.

8. The method according to claim 5, wherein the reaction initiator is added before or after the cationization agent is added.

9. The method according to claim 1, wherein the cationization reaction is performed for at least 10 minutes to less than 10 hours.

10. The method according to claim 1, wherein the cationization reaction is performed for at least 10 minutes to less than 1 hour.

* * * * *